Oct. 29, 1968  KAZUO YASUNAMI  3,407,644
METHOD AND APPARATUS FOR GENERATING STANDARD PRESSURE
Filed June 3, 1966

INVENTOR.
KAZUO YASUNAMI
BY
Kurt Kelman
Agent

United States Patent Office 3,407,644
Patented Oct. 29, 1968

3,407,644
METHOD AND APPARATUS FOR GENERATING STANDARD PRESSURE
Kazuo Yasunami, Hyogo-ken, Japan, assignor to Kobe Steel Ltd., Kobe, Japan
Filed June 3, 1966, Ser. No. 555,190
Claims priority, application Japan, June 15, 1965, 40/35,181
3 Claims. (Cl. 73—4)

ABSTRACT OF THE DISCLOSURE

A cylinder containing a deformable sleeve which provides a chamber for fluid under pressure and has a piston slidable therein. A manually adjustable compensator varies the volume of the pressure chamber and an indication of its adjustment is compared with displacement of the piston which is loaded by a weight. Controlled external pressure is applied to deform the sleeve so that the piston is balanced under a condition of no friction and no leakage between the piston and the sleeve.

---

This invention relates to a method and an apparatus for generating standard pressure and, particularly relates to a method and an apparatus for generating standard high pressure with high accuracy to be used when calibration or test is applied to a pressure instrument.

Figure 1:
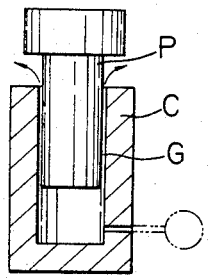

Heretofore, in order to generate a desired standard pressure having a constant magnitude, a system for using a weight corresponding to the standard pressure is commonly utilized. As shown in FIG. 1, in the system for using a weight, a piston P having unit sectional area and a cylinder C are used and pressurized medium is enclosed in the cylinder C. The standard pressure corresponding to the weight is generated in the cylinder C by applying a pressure to the pressurized medium by putting the standard weight on the piston P. In the system referred to above, there are two principal problems because the piston slides within the cylinder.

The first problem is due to the mechanical friction occurring between the cylinder and the piston, it being necessary to make the mechanical friction as small as possible. In order to make the mechanical friction small, something corresponding to a packing is not used but the inner surface of the cylinder and the outer surface of the piston are finished precisely so that the piston is directly fitted with the cylinder to keep a miniaturized clearance G therebetween. The construction allows the pressurized medium to leak upward through the clearance G and the piston P can be lowered relative to the cylinder C without any direct mechanical friction therebetween. However, to provide the clearance G between the piston P and the cylinder C offers a second problem in which the effective pressure receiving area is not easily determined, said pressure receiving area being defined as an area on which the load of the weight W is applied. Therefore, it is commonly operated in the prior art that the piston P is lowered in calm while the pressurized medium leaks from the clearance G, the lowering speed is measured and the effective pressure receiving area is determined in consideration of the possible deformation of the cylinder C due to the pressure applied thereto.

In the leakage system stated above, no specific problem is brought about until the pressure goes up to about 1000 atmospheric pressure. However, as frequently utilized in these days, when the pressure goes over some thousand to 10 thousand atmospheric pressure, which referred to as a super high pressure, the expansion of the cylinder due to the super high pressure cannot be negligible. The clearance between the cylinder and the piston becomes so wide that the pressurized medium leaks through the clearance intensively. Therefore, the condition balancing the weight with the pressure cannot be obtained and it is impossible to generate and maintain a standard high pressure.

In order to obtain a standard super high pressure a design was provided in which the cylinder is duplicated and an external pressure is applied to the outer side of the inner cylinder so as to prevent the inner cylinder from expanding. In this design, the enlargement of the clearance is prevented but the measurement is effected through the leakage system as it used to be. Therefore, under the super high pressure it is extremely difficult to obtain a standard pressure with high accuracy in a balanced condition since the temperature of the pressurized medium rises accompanied by the leakage and the leakage condition as well as the size of the cylinder vary.

An object of this invention is to provide a method for generating and maintaining a standard super high pressure with high accuracy at the same time the friction between the piston and the cylinder and the leakage of the pressurized medium in the weight system can be simultaneously eliminated.

In order to attain the object, in subject invention duplicated cylinders and piston are provided and an external pressure is applied to an inner cylinder of the duplicated cylinders to generate a standard pressure within the inner cylinder which is balancing with the weight characterizing that the volume of a standard pressure chamber constituted by the inner cylinder and the piston is made to be adjustable by means of a variable valve and the difference between the indication of the adjusted volume of the standard pressure chamber and the indication of the displacement of the piston in the axial direction of the piston is detected so as to control the external pressure under the condition that no friction and no leakage between the piston and the cylinder exist.

Figure 2:
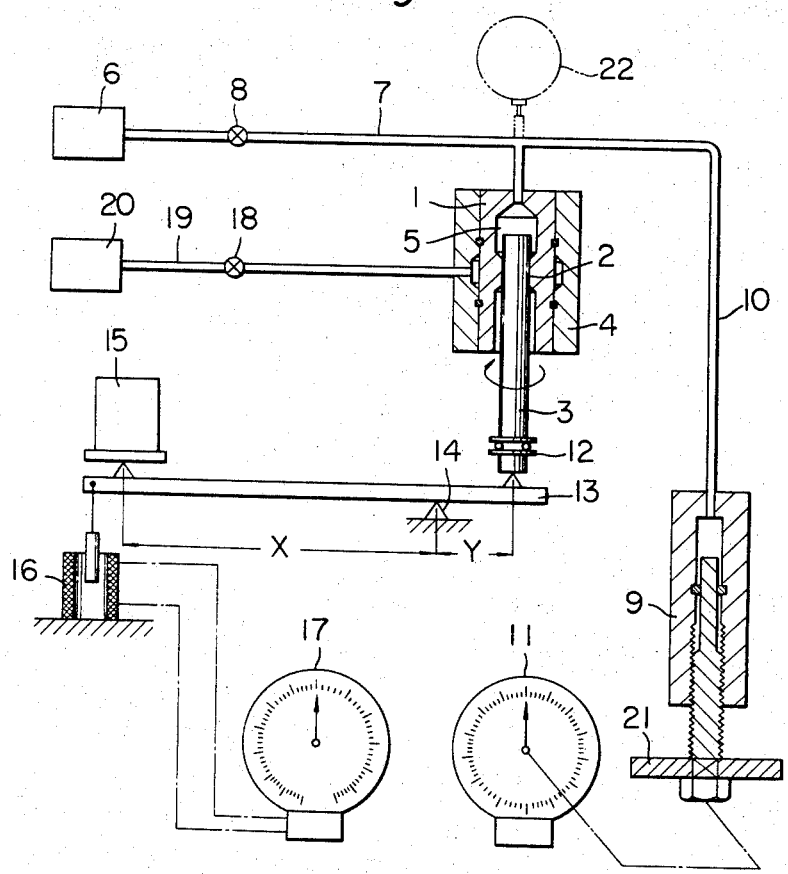

The object and advantage of this invention will become apparent from the following detailed description, in which:

FIG. 1 is a skeleton diagram showing the principle of a conventional method for generating a standard pressure, and FIG. 2 is an embodiment of the method and apparatus for generating a standard pressure provided in accordance with this invention.

In FIG. 2, the inner surface of an inner cylinder or sleeve 1, within which a standard pressure is to be generated, forms a sliding part 2, into sliding part 2 being inserted a piston 3 from downward of inner cylinder 1. An outer cylinder 4 fits on the outer surface of inner cylinder 1. A standard pressure chamber 5 is provided within inner cylinder 1 and upward from sliding part 2. A piping 7 connects a pressure source 6 to standard pressure chamber 5 and a stop valve 8 is provided between pressure source 6 and standard pressure chamber 5 to interrupt the pressurized medium to reach from pressure source 6 to standard pressure chamber 5. A piping 10 is provided to connect standard pressure chamber 5 to a variable valve or compensator 9 which is provided with an indicator 11 to indicate the adjusted volume of variable valve 9.

The lower end of piston 3 is supported on one end of a lever 13 which is horizontally located through a thrusting member 12. Piston 3 is rotated gradually in order to register the piston at the center of the cylinder and to reduce the friction between the piston and the cylinder. Lever 13 is supported by a fulcrum 14 which is at a point near to piston 3 and on a point opposite to piston 3 a weight 15 is mounted. A differential transformer 16 is provided at a point which is near to weight 15 to detect the displacement in the horizontal direction of the lever and the detection of differential transformer 16 is indicated by indicator 17.

A piping 19 is provided to connect outer cylinder 4 and another pressure source 20, another stop valve 18 being provided therebetween.

A manometer 22 may be connected to piping 10 at a point as shown in FIG. 2 when the manometer is to be calibrated by means of the apparatus provided in accordance with this invention.

An example as to how to operate the apparatus of this invention is shown in connection with FIG. 2 as follows:

Stop valves 8 and 18 are opened and the pressure is applied to standard pressure chamber 5 and the inner side of outer cylinder 4, respectively from pressure sources 6 and 20 through stop valves 8 and 18. The pressurized medium coming from pressure source 6, which is the standard pressure source, is also applied to variable valve 9 through piping 10.

A weight 15 corresponding to the standard pressure to be obtained is put on the end of lever 13.

Assuming that

Sectional area of piston 3 _____ cm.$^2$__ 1
Ratio of lever 13 to the right half to the left half ___ 1:20
Weight 15 _____ kg__ 250 then the standard pressure is obtained as 5000 kg./cm.$^2$.

The right end of lever 13 is urged upward by means of weight 15 and piston 3 is pushed upward. In order to keep piston unmoved a pressure corresponding to the compression of the medium in standard pressure chamber 5 is to be introduced from pressure source 6 to the standard pressure chamber, this pressure being the standard pressure (such as 5000 kg./cm. in the assumption stated above). The condition of balancing weight 15 with the pressure in standard pressure chamber 5 is as certained by indicator 17 by detecting the vertical position of lever 13 by means of differential transformer 16.

When the standard pressure in standard pressure chamber 5 is a standard super high pressure, the pressurized medium tends to leak downward through the clearance between the outer surface of piston 3 and sliding part 2 and also tends to expand inner cylinder 1. If the leakage really exists, the standard pressure once generated in standard pressure chamber 5 decreases gradually and the constant standard pressure is not kept with high accuracy. In order to prevent the leakage, the external pressure to be applied into outer cylinder 4 is enlarged and the inner diameter of inner cylinder 1 is reduced. Under such circumstance, the clearance becomes smaller but when the external pressure is made too large a remarkable friction between the piston and the cylinder is brought about due to the fact that piston 3 is tighter by the shrinkage of inner cylinder 1. This causes the piston not to easily slide on sliding part.

In this invention, the leakage of the pressurized medium is prevented and the piston can freely slide without any friction between the piston and the cylinder in the following manners:

When once a standard pressure is generated in standard pressure chamber 5, stop valve 8 is closed to provide a closed pressure system to the atmosphere. A handle 21 of variable valve 9 is rotated in a sense, which is referred to a positive sense, to reduce the volume in the closed pressure system by a value $\Delta V$. The pressure in the closed pressure system is increased so that piston 3 is lowered to move lever 13. The value $\Delta V$ is indicated by indicator 11 and the movement of lever 13 is also indicated by indicator 17. Therefore, if there is no leakage of the pressurized medium between the piston and the cylinder, the indication of indicator 11 is to coincide with the indication of indicator 17.

The reason why the indication of indicator 11 is to coincide with the indication of indicator 17 is that if there is no leakage from the clearance, piston 3 is to move by an amount corresponding to the movement of variable valve 9 in the positive direction. However, in spite of no leakage there is a possibility in which the movement of indicator 17 does not correspond to the movement of indicator 11 or, if it corresponds, the movement of indicator 17 moves extremely slightly. This may be based on the fact that a considerable friction exists between piston 3 and sliding part 2 so that piston 3 hardly moves. Under these circumstances, the external pressure to be applied to outer cylinder 4 is decreased to untighten inner cylinder 1 having compared indicator 11 with indicator 17. The friction between the cylinder and the piston can be eliminated by adjusting the external pressure referred to above.

When indicator 17 moves in the negative side even without operating variable valve 9 so that piston 3 rise naturally, this indicates that the pressure in standard pressure chamber 5 is gradually decreasing through the leakage along piston 3. This leakage can be stopped by increasing the external pressure applied to the outside of inner cylinder 1 to reduce the clearance between cylinder 1 and piston 3. Then variable valve 9 is rotated in the negative sense to increase the volume of the closed pressure system and a condition in which no leakage and no friction exist is generated can be maintained by effecting a similar adjustment.

The standard high pressure desired to obtain can be generated and maintained by the two kind of adjustment referred to above and the numerical explanation is given as follows:

The relation between the indications of indicators 11 and 17 is given by Equation 1.

$$M = R.h.\frac{As}{Ae}N \tag{1}$$

where

M: the displacement of differential transformer 16 (reading of indicator 17)
R: the ratio of the displacement of differential transformer 16 to the displacement of piston 3
$h$: the pitch of the screw of the shaft of variable valve 9
N: the revolution of variable valve 9 (reading of indicator 11)
$As$: the sectional area of variable valve 9
$Ae$: the sectional area of piston 3

Assuming that the actual displacement of the differential transformer is given by $Md'$ when the shaft of variable valve 9 is rotated clockwise by N turns to lower piston 3, that the actual displacement of the differential transformer is given by $Mu'$ when the shaft of variable valve 9 is rotated counterclockwise by N turns to raise piston 3 and that the calculated displacement of the differential transformer is given by M. The accuracy of the standard pressure generated is given by an error percentage $\alpha e$ due to the leakage and by an error percentage $\alpha f$ due to the friction, both error percentages being given as follows:

$$\alpha e = \frac{\Delta Pl}{P} = \frac{Ae}{PV\mu R}\left(\frac{Md' - Mu'}{z}\right) \tag{2}$$

$$\alpha f = \frac{\Delta Pf}{P} = \frac{Ae}{PV\mu R}\left(M - \frac{Mu' + Md'}{2}\right) \tag{3}$$

where $\Delta Pl$: the differential of pressure drop due to the leakage of the pressurized medium entrapped by stop valve 8
$\Delta Pf$: the differential of pressure drop due to the friction of the pressurized medium entrapped by stop valve 8
P: the standard pressure entrapped
V: the volume of the pressurized medium entrapped
$\mu$: the compression coefficient of the pressurized medium at the standard pressure The condition in which no leakage exists is given as follows from Equations 2 and 3:

$$Md' = Mu'$$

The condition in which no friction exists is given as follows from Equations 2 and 3:

$$M = \frac{Mu' + Md'}{2} \text{ or } M - Md' = Mu' - M$$

The condition in which neither leakage nor friction exist is given as follows:

$$M = Mu' = Md'$$

When these conditions referred to above are satisfied the object of this invention can be attained, in other words the standard pressure can be maintained with high accuracy.

As stated above precisely, in accordance with this invention, by comparing the adjustment of the volume of the pressure system maintaining the standard pressure and the vertical displacement of the piston by means of respective indicators, by detecting the friction between the pitson and the cylinder and the leakage in pressure and by regulating the external pressure accordingly, the weight can be balanced with the pressure under neither friction nor leakage and the standard pressure can be maintained with ascertaining that the operation is effected with high accuracy. Therefore, it can be easily possible to generate a standard super high pressure with high accuracy which was hardly obtained in the conventional weight system.

While a preferred embodiment of the present invention is disclosed, it is recognized that the scope of the present invention is not limited thereto and it is therefore intended that the scope of the present invention be defined by the scope of the appended claims.

What we claim is:

1. In an apparatus for generating and accurately controlling high standard fluid pressure as for instrument calibration and the like, the combination of a cylinder, a radially deformable sleeve positioned in said cylinder and providing a chamber therein for fluid under high pressure, a piston slidable in said sleeve for reaction against fluid pressure in said chamber, adjustable means for varying the volume of said chamber in relation to displacement of said piston, means indicating adjustment of said chamber volume varying means, a weight acting on said piston to balance the same against fluid pressure in said chamber, means for detecting and indicating displacement of the piston from a balanced condition, said volume adjustment indicating means and said piston displacement indicating means being comparable with each other, and means for applying inward radial pressure externally to said sleeve in said cylinder in a controlled manner dictated by comparison of the two indicating means, whereby the piston may be balanced under a condition of no friction and no leakage of fluid between the piston and the sleeve.

2. The apparatus as defined in claim 1 wherein said chamber volume varying means comprise a variable volume compensator communicating with said chamber, and manually actuated means for varying the volume of said compensator, said manually actuated means being operatively connected to said volume adjustment indicating means.

3. A method of generating and accurately controlling high standard fluid pressure as for instrument calibration and the like, said method comprising the steps of balancing fluid under high pressure against a weight-loaded piston which is slidable in a radially deformable chamber-forming sleeve, varying the volume of the chamber in relation to displacement of the piston, indicating the chamber volume variation, detecting and indicating displacement of the piston from a balanced condition, comparing the indications of chamber volume variation and piston displacement with each other, and applying inward radial pressure externally to the sleeve in a controlled manner dictated by comparison of the indications, whereby the piston may be balanced under a condition of no friction and no leakage of fluid between the piston and the sleeve.

References Cited

UNITED STATES PATENTS 2,796,229    6/1957    Newhall.
3,239,827    3/1966    Werner et al. _____ 73—4

OTHER REFERENCES

Journal of Scientific Instruments, vol. 24, No. 11, November 1947, p. 284, "A Precision Recording Manometer."

S. CLEMENT SWISHER, *Acting Primary Examiner.*

NEIL B. SIEGEL, *Assistant Examiner.*